(12) United States Patent
Lewis et al.

(10) Patent No.: US 6,314,397 B1
(45) Date of Patent: Nov. 6, 2001

(54) METHOD AND APPARATUS FOR PROPAGATING CORRECTIONS IN SPEECH RECOGNITION SOFTWARE

(75) Inventors: James R. Lewis, Delray Beach; Kerry Ortega, Deerfield Beach, both of FL (US); Barbara Ballard, Kansas City, MO (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/290,858

(22) Filed: Apr. 13, 1999

(51) Int. Cl.[7] ................................................. G10L 15/26
(52) U.S. Cl. .......................................... 704/235; 704/275
(58) Field of Search ................................... 704/200, 270, 704/275, 235, 272, 251, 255, 256, 257, 246, 231, 243

(56) References Cited

U.S. PATENT DOCUMENTS

| | | | |
|---|---|---|---|
| 4,914,704 | * 4/1990 | Cole et al. | 704/235 |
| 5,761,687 | * 6/1998 | Hon et al. | 707/531 |
| 5,799,273 | * 8/1998 | Mitchell et al. | 704/235 |
| 5,909,667 | * 6/1999 | Leontiades et al. | 704/275 |
| 5,970,460 | * 10/1999 | Bunce et al. | 704/278 |
| 6,064,959 | * 5/2000 | Young et al. | 704/251 |

* cited by examiner

Primary Examiner—Richemond Dorvil
(74) Attorney, Agent, or Firm—Akerman Senterfitt

(57) ABSTRACT

In a computer system having a word processing application adapted for speech recognition, a method and system to propagate corrections in dictated text. in response to a first user command, a first error word is selected to be corrected from a word processing file containing dictated text. The error word is replaced by a correct word selected by a user. The system subsequently searches the dictated text contained in the document fie in response to another user command to locate a second or subsequent error word that is a close acoustic match to the first error word. The second or subsequent error word may then be replaced using a word selected from an alternate word list.

13 Claims, 6 Drawing Sheets

METHOD AND APPARATUS FOR PROPAGATING CORRECTIONS IN SPEECH RECOGNITION SOFTWARE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software and more particularly to propagation of corrections in speech recognition software.

2. Description of the Related Art

Speech recognition software has a wide variety of uses. One important area where this technology has proved to be very useful is the conversion of spoken utterances into text for inclusion in a word processing document. Word processing applications may have incorporated therein a speech recognition function. Alternatively, a variety of speech recognition programs are commercially available which provide the speech recognition function to existing non-speech enabled word-processing applications. In any case, the ability of these speech enabled word processing applications to convert human speech into text has improved dramatically in recent years. Due to a variety of factors, however, errors may yet occur in the speech recognition function performed by such applications. Accordingly, it is often necessary for a user to review a document which has been dictated to a word processing application by means of such speech recognition software.

One notable aspect of error words existing in a speech enabled word processing application is that they tend not to be misspelled, but are instead words which have been misrecognized. Such error words are typically a close acoustic match to the correct word, but often involve spelling variations or in some instances may be an entirely unrelated but similar sounding word or words. These errors may be difficult to detect by automated means such as conventional spell checking features provided with word processing applications. This is primarily due to the fact that such words tend to be spelled correctly but are otherwise erroneous in the context of the text.

Moreover, when a misrecognition occurs by a speech recognition engine in the course of converting a string of spoken utterances to text, such misrecognitions can tend to be repeated as the speech recognition engine continuously misrecognizes the same spoken utterance for the same or other erroneous text words. This may occur when the spoken utterance is out of vocabulary for the speech recognition engine or may be related to some other problem such as an individual's unconventional pronunciation of such word. In any case, the ability to efficiently correct such errors throughout a text document is important to the ability to efficiently make use of speech enabled word processing applications.

SUMMARY OF THE INVENTION

The invention concerns a method to propagate corrections in dictated text stored in a word processing application document file where the word processing application is equipped for speech recognition. In response to a first user command selecting a first error word to be corrected from the dictated text, the system replaces the first error word with a correct word selected by a user. Subsequently, in response to a second user command, the system searches the remainder of the dictated text in the word processing application document to locate a second or subsequent error word that is a close acoustic match to the first error word. The second or subsequent error word may then be replaced with the correct word.

According to one aspect of the invention, the second or subsequent error word may be located by text matching a word in the dictated text to an alternate word contained in an alternate word list for the first error word. According to another aspect of the invention, the second or subsequent error word may be located by text matching the first error word to a word in the dictated text.

For the convenience of a user, an alternate word list is displayed when the first error word is selected. The first error word may then be replaced by the correct word selected from the alternate word list. If the correct word is not in the list, the user preferably adds it and the correct word is then preferably displayed as part of the alternate word list when a subsequent error word is located.

According to another aspect, the invention may be embodied in a computer system having a word processing application adapted for speech recognition. In that case, the system includes application programming responsive to a first user command for selecting a first error word to be corrected in the document file, programming for replacing the first error word in the document file with a correct word selected by a user, and further programming for searching the document file in response to a second user command to locate a second or subsequent error word that is a close acoustic match to the first error word. According to one aspect, the computer system includes application programming for replacing the second or subsequent error word in the document file with the correct word.

According to another aspect of the invention application programming is provided for locating the second or subsequent error word by text matching a word in the document file to an alternate word contained in an alternate word list for the first error word. Alternatively, or in addition thereto, application programming can be provided for locating the second or subsequent error word by text matching the first error word to a word in the document file.

Further programming is provided for displaying an alternate word list when the first error word is selected. The system also provides programming for replacing the first error word with the correct word selected from the alternate word list. The software then adds the correct word to the alternate word list and displays the alternate word list when the second or subsequent error word is located.

Finally, the invention may take the form of a machine readable storage having stored thereon a computer program having a plurality of code sections executable by a machine for causing the machine to perform a set of steps including: a) storing in a memory a word processing application document file containing dictated text; b) in response to a first user command, selecting a first error word to be corrected in the dictated text; c) replacing the first error word with a correct word selected by a user; and d) searching the dictated text in response to a second user command to locate a second or subsequent error word that is a close acoustic match to the first error word.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
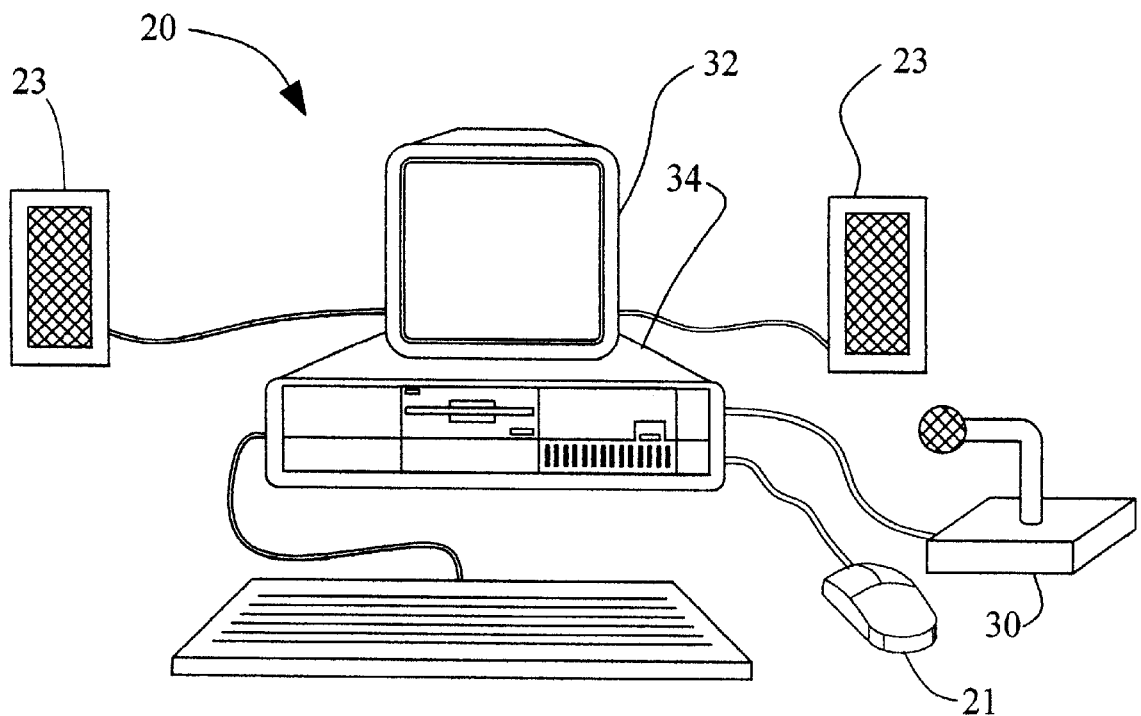
FIG. 1 is a block diagram which illustrates a computer system for speech recognition.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
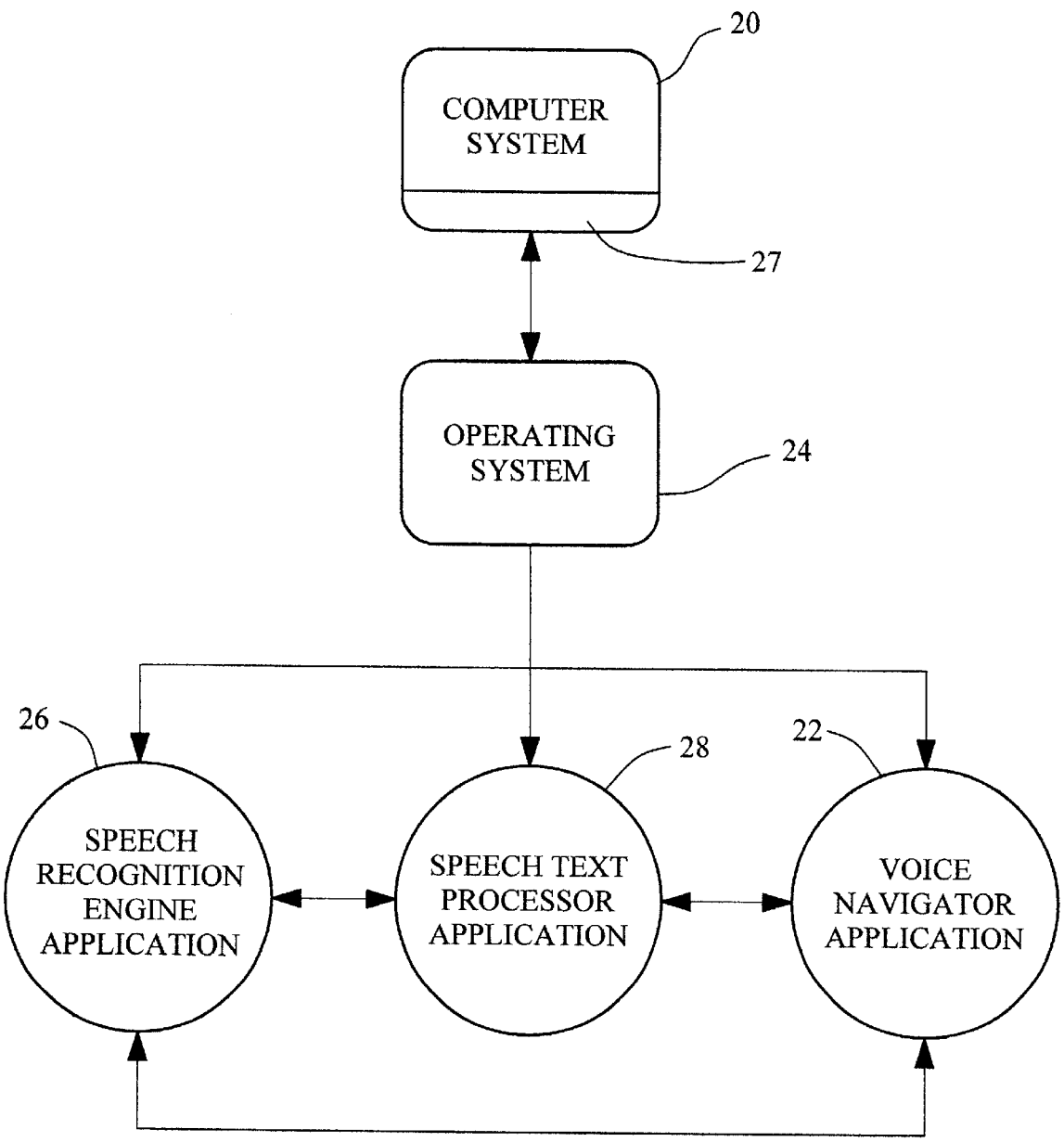
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A speech text processor application 28 and a voice navigator application 22 may also be provided. In FIG. 2, the speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor application and speech recognition engine, then the system may be modified to operate without the voice to navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
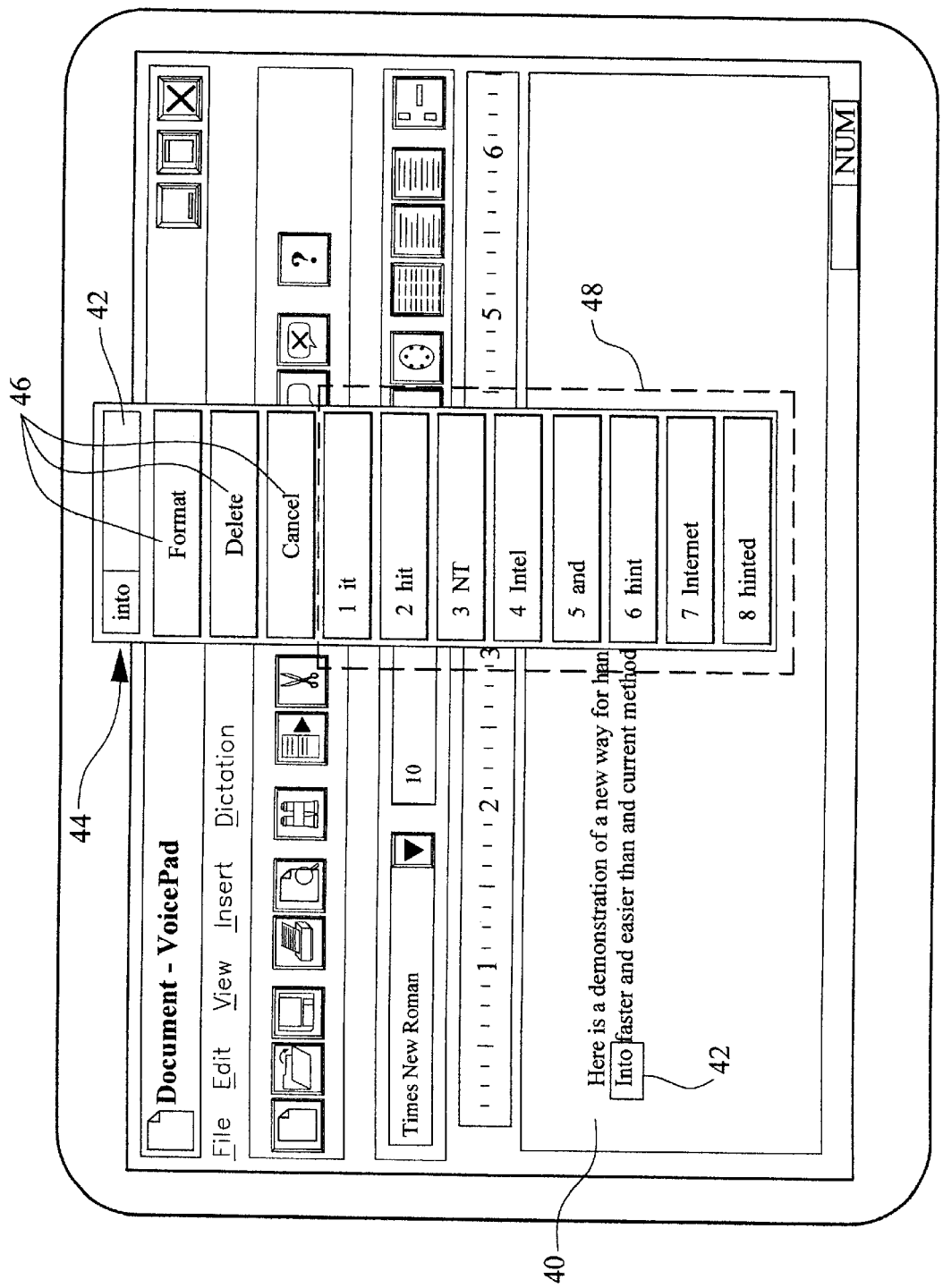
FIG. 3 is a screen display of a document created by a speech text processor application.

Information concerning each word identified by the speech recognition engine 26 is passed to the speech text processor application 28 in the form of text so that the words can be inserted into a word processing document. FIG. 3 shows an example of word processing document 40 which can be displayed on a video data terminal 32. In the case of speech recognition software used for dictation purposes, users frequently find that certain words which have been spoken repeatedly in the course of creating a particular document may be repeatedly misidentified by the speech recognition software. When this occurs, the particular misidentified word may not exist within the speech recognition engine's vocabulary or it may be the case that the user's pronunciation is causing difficulties. In any case, such error words must subsequently be selected by a user in each instance where it appears in a body of dictated text so that it may be corrected.

The correction process may occur using speech commands as shown in FIG. 3, whereby an error word 42 appearing in a text can be spoken while the word recognition software is in a correction mode. By saying the error word, the user indicates that the particular word requires correction. It will be readily appreciated that the word to be corrected may also be selected in a conventional manner by making use of mouse or keyboard controls. In FIG. 3 the highlighted error word 42 is "into" and it can be seen that be speaking the error word a list 48 of possible alternative words can be made to appear in a list box 44. Commands 46 may also be used to control the operation of the list box 44. Significantly, however, when the misrecognized word is out of vocabulary for the word recognition engine, or is not on the alternative word list, then the user must type the desired word several times or at least once for each erroneous occurrence.

Figure 4:
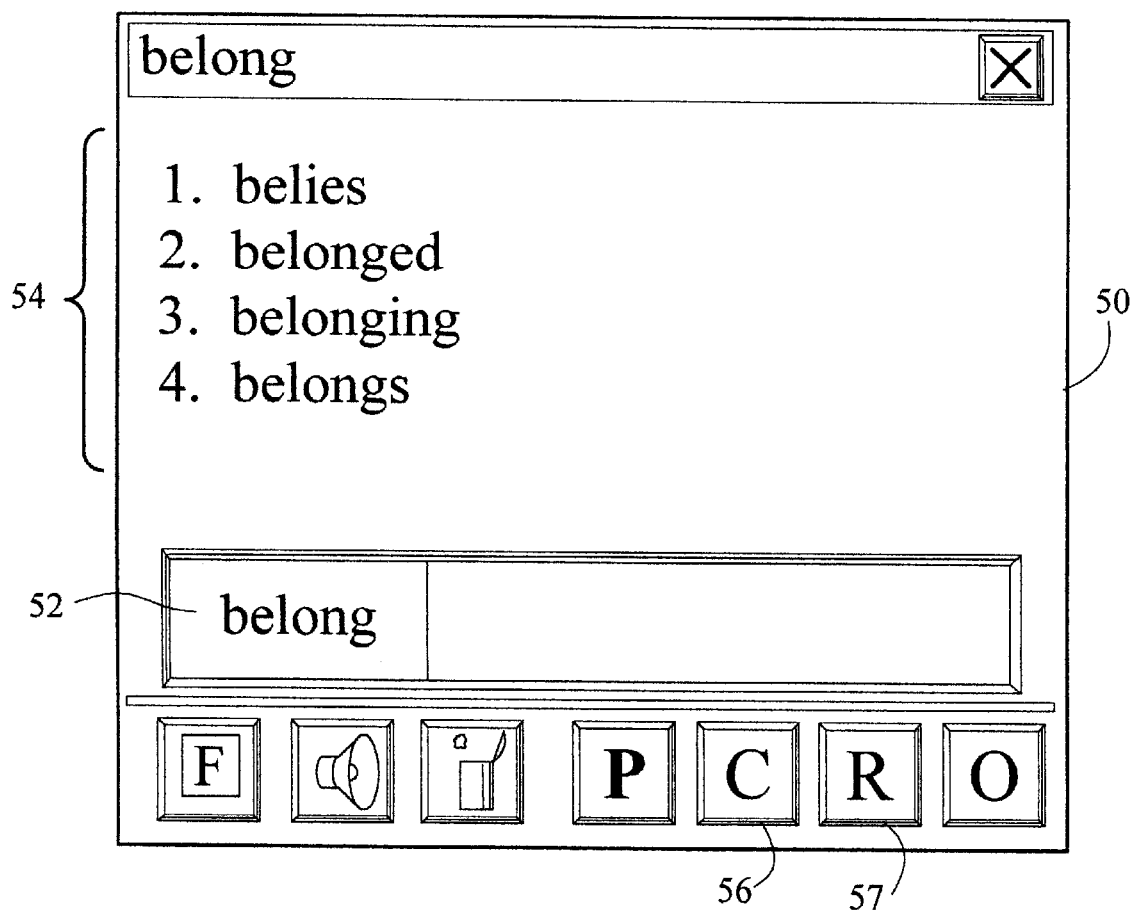
FIG. 4 is a correct error dialog box for use with the invention.
Figure 5:
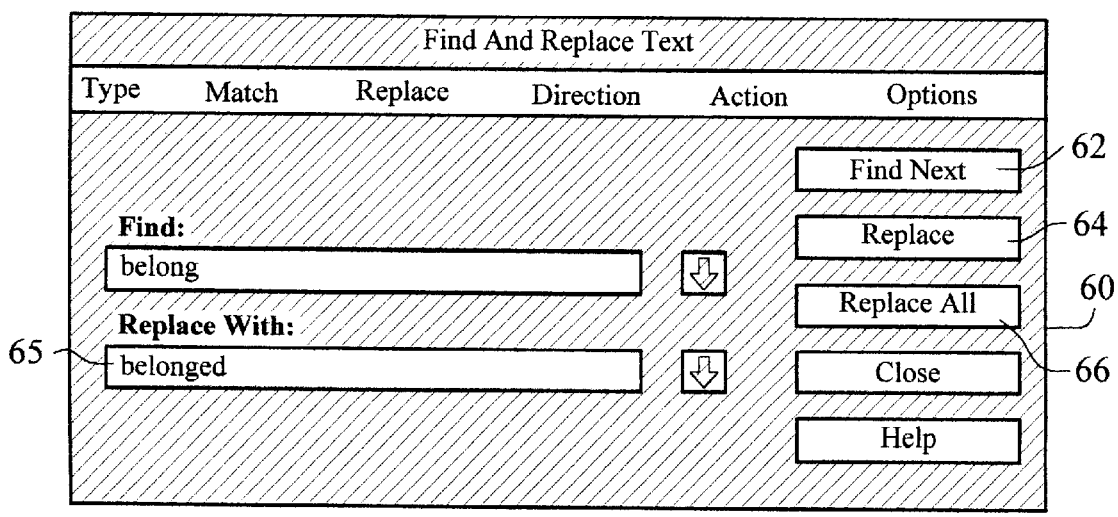
FIG. 5 is a find and replace text dialog box for use with the invention.
Figure 6A:
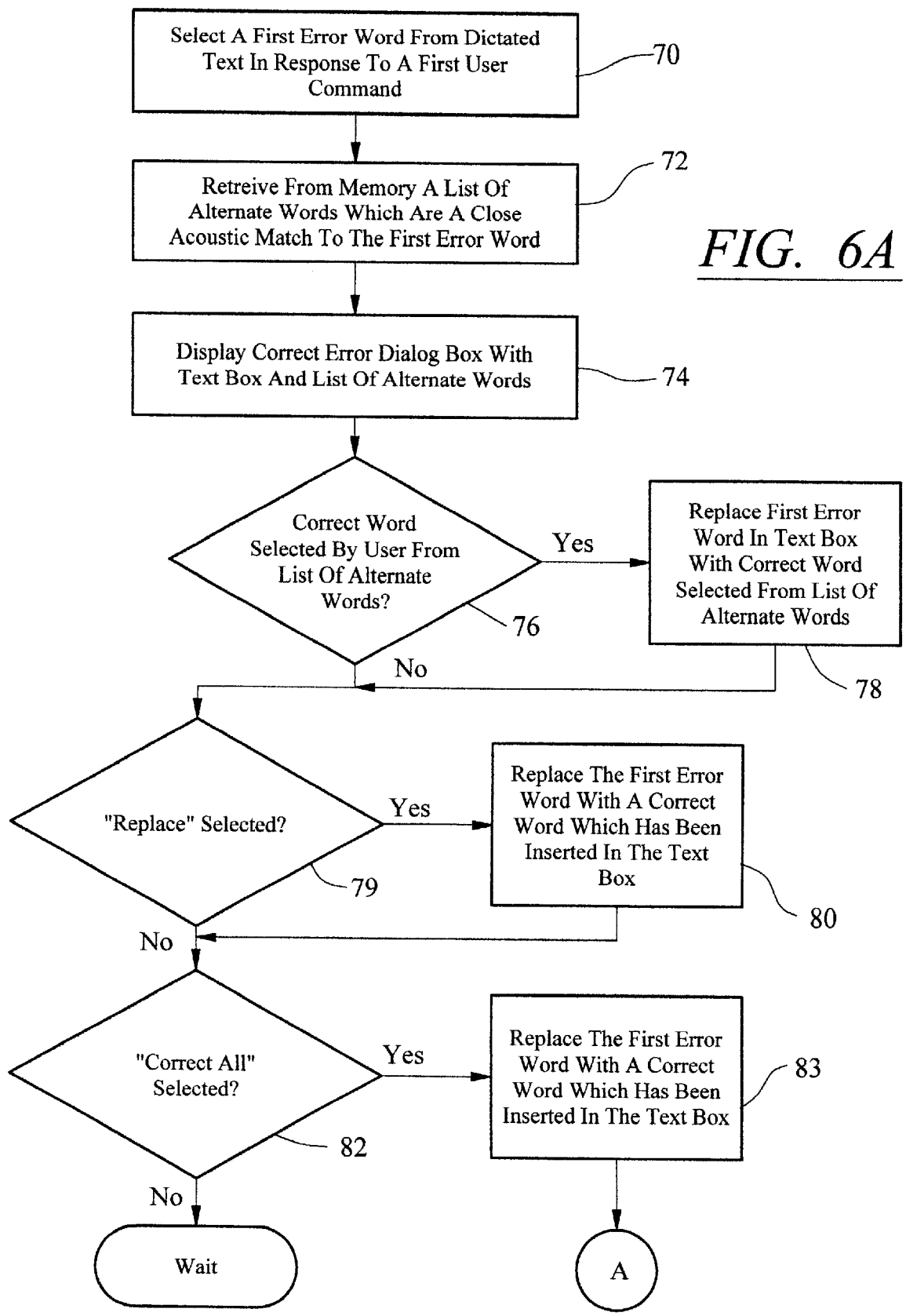
FIG. 6 is a flow chart illustrating the process according to the present invention.
Figure 6B:
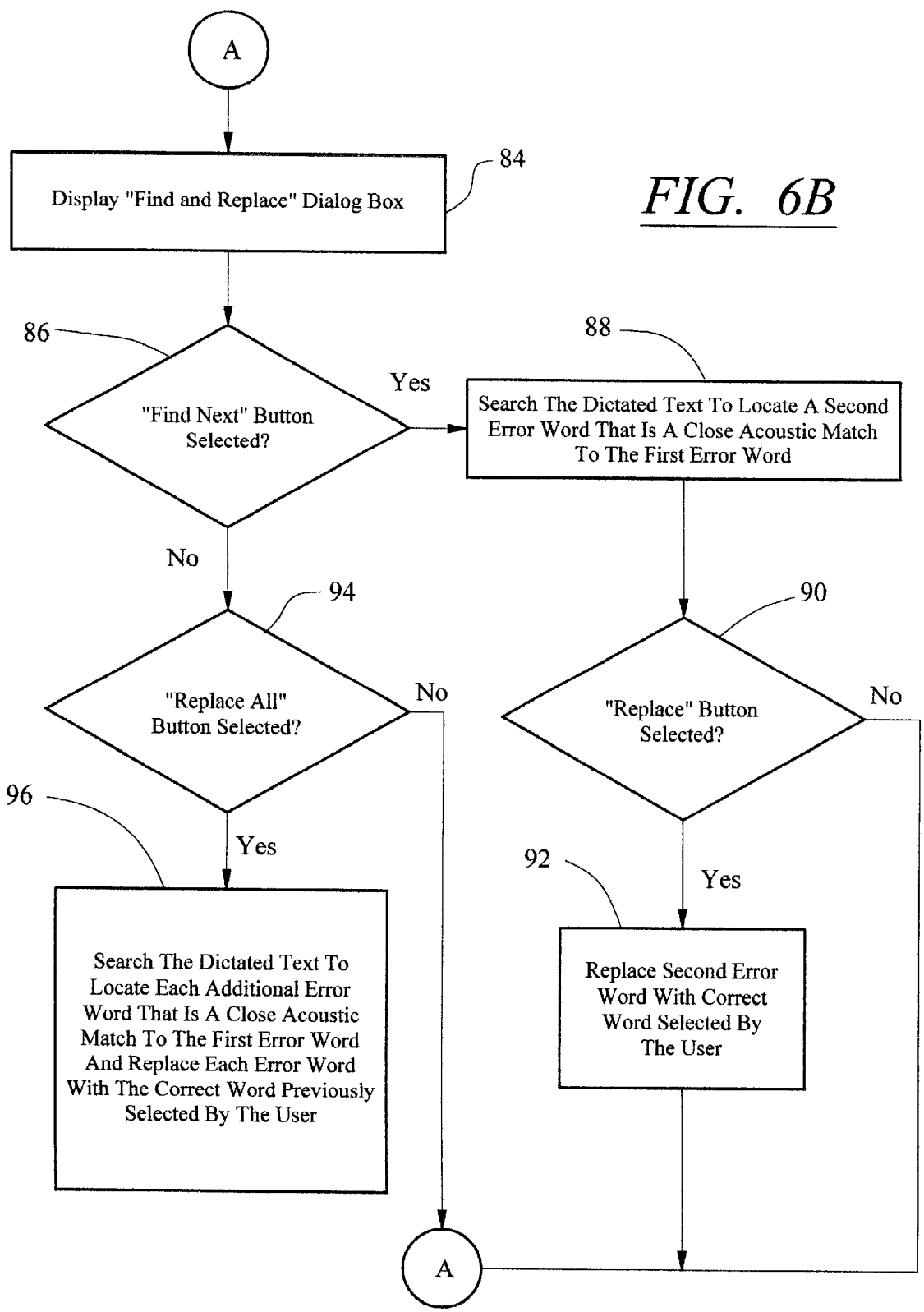

FIGS. 4, 5, and 6 illustrate a preferred embodiment according to the present invention, whereby the repeated manual correction of a misrecognized word appearing several times in a dictated text may be avoided. As shown in FIG. 4, when a user selects a word for correction, a correction dialog box 50 appears. This process is shown in steps 70, 72 and 74 in FIG. 6A. Correction dialog box 50 is similar to the list box 44 in that it also contains a list 54 of possible alternatives to the misrecognized-word. If the user identifies in step 76 a word among the list of possible alternatives which is the correct word, that word may be selected to be inserted in place of the error word in step 78. In FIG. 4, the misrecognized or error word 52 is "belong". If the correct word is actually "belonged", then such word would replace the highlighted word "belong" in the dialog box at step 80 after the user speaks such word or clicks upon it with a mouse . In step 79, if the user chooses the "replace" command, the error word is corrected in step 80.

According to a preferred embodiment of the invention, the correction dialog box 50 also includes a "correct all" button 56. By activating the "correct all" button or saying the associated voice command in step 82, the user causes the error word to be replaced in step 83 with the correct word which was inserted in the text box in step 78. Further, when the "correct all" command 56 is activated as described above, the system preferably begins a process shown in FIG. 6B by which the speech recognition engine application 26 will search through the dictated text for words which are acoustically similar to the error word so that they may be replaced with a correct word. This process shall now be described in more detail.

In step 84, the system displays a second dialog box 60 as shown in FIG. 5 which is similar to a standard find and replace dialog box as commonly appears in many word processing applications. If the user wishes to view and make corrections one at a time, the "find next" and "replace" buttons 62 and 64 may be used in a conventional manner by activating them in steps 86 and 90 with a suitable pointing device, keystroke or by voice command. According to a preferred embodiment, when the "find next" command is activated in step 86, the system begins searching through the document in step 88 for instances in which there is a close acoustic match to the target utterance. The target utterance can be the error word, correction word which is highlighted in the dialog box in FIG. 4, or both. Alternatively, the system can concurrently search for alternate words which are a close acoustic match to either of these words. The acoustic matching process is made possible by the use of information contained in the speech recognition engine application concerning acoustic models for words in the system's vocabulary. According to a preferred embodiment, the speech recognition engine application can identify a set of words having an acoustic model which is identified as similar to the target utterance. The system then searches for the text equivalent of these words in the dictated text appearing in the document. Of course, it will be appreciated by those skilled in the art that this is merely one possible way in which the acoustic matching process can be accomplished, and the invention is not intended to be limited in this regard.

In addition to the acoustic matching process as described above, the system may also use other sources of information for targeting corrections, including text matching the original error word selected for correction against the rest of the text in the document. Alternatively the system may search for additional potential error words by locating words in the text which match those contained on the alternate word list 54.

Once the system finds acoustic matches for the target utterance in step 88, the text appearing in the word processing document is preferably highlighted or otherwise demarcated. The system can add to the correction dialog box list of alternate words 54 the correct word or replacement text which the user previously selected to correct the misrecognized text 52. This correct word also preferably persists in the text area 65 of the find and replace dialog box 60.

For each acoustic match which is located in step 88, the user has the option of activating the "replace" command in step 90. If activated, the "replace" command causes the additional error word to be corrected in step 92.

Alternatively, if the "Find Next" command is not activated in step 86 then the "Replace All" command may be activated by the user by voice, mouse or keyboard means in step 94. If the system receives the "Replace all" command, it proceeds in step 96 to search the dictated text as described above to locate each additional potential error word which is a close acoustic match to the target utterance. Once located, each additional error word thus located is automatically corrected in step 96.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer system having a word processing application adapted for speech recognition, a method to propagate corrections in dictated text comprising:

in response to a first user command, selecting a first error word to be corrected from the dictated text;

replacing said first error word with a correct word selected by the user; and in response to a second user command, searching among remaining words in the dictated text for additional error words that have an acoustic model which is similar to an acoustic model associated with said first error word.

2. The method according to claim 1 further comprising the step of replacing said each additional error word in the dictated text with said correct word.

3. The method according to claim 1 further comprising locating said additional error words by text matching a word in the dictated text to an alternate word contained in an alternate word list for said first error word.

4. The method according to claim 1 further comprising locating said additional error words by text matching said first error word to a word in the dictated text.

5. The method according to claim 1 further comprising:

displaying an alternate word list when said first error word is selected; and replacing said first error word with said correct word selected from said alternate word list.

6. The method according to claim 5 further comprising adding said correct word to said alternate word list and displaying said alternate word list when each of said additional error words is located.

7. In a computer system having a word processing application adapted for speech recognition, a system for propagating corrections in a word processing application document file comprising:

means responsive to a first user command for selecting a first error word to be corrected in said document file;

means for replacing said first error word in said document file with a correct word selected by a user;

means responsive to a second user command for searching remaining words in said document file for additional error words that have an acoustic model which is similar to an acoustic model associated with said first error word.

8. The system according to claim 7 further comprising means for replacing each of said additional error words in said document file with said correct word.

9. The system according to claim 7 further comprising means for locating each additional error word by text matching a word in said document file to an alternate word contained in an alternate word list for said first error word.

10. The system according to claim 7 further comprising means for locating each of said additional error words by text matching said first error word to a word in said document file.

11. The system according to claim 7 further comprising:

means for displaying an alternate word list when said first error word is selected; and means for replacing said first error word with said correct word selected from said alternate word list.

12. The system according to claim 11 further comprising means for adding said correct word to said alternate word list and displaying said alternate word list when each of said additional error words is located.

13. A machine readable storage, having stored thereon a computer program having a plurality of code sections executable by a machine for causing the machine to perform the steps of:

storing in a memory a word processing application document file containing dictated text;

in response to a first user command, selecting a first error word to be corrected in said dictated text;

replacing said first error word with a correct word selected by a user; and in response to a second user command, searching among remaining words in said dictated text for additional error words that have an acoustic model which is similar to an acoustic model associated with said first error word.

* * * * *